(12) United States Patent
Proebstle

(10) Patent No.: US 9,656,620 B2
(45) Date of Patent: May 23, 2017

(54) BACKUP STORE WITH CENTER TAP FOR VEHICLE ONBOARD POWER SUPPLY SYSTEM

(71) Applicant: Bayerische Motoren Werke Aktiengesellschaft, Munich (DE)

(72) Inventor: Hartmut Proebstle, Wuerzburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 394 days.

(21) Appl. No.: 14/521,680

(22) Filed: Oct. 23, 2014

(65) Prior Publication Data

US 2015/0042161 A1 Feb. 12, 2015

Related U.S. Application Data

(63) Continuation of application No. PCT/EP2013/058471, filed on Apr. 24, 2013.

(30) Foreign Application Priority Data

Apr. 25, 2012 (DE) .................... 10 2012 206 772

(51) Int. Cl.
*B60R 16/033* (2006.01)
*H02J 1/10* (2006.01)
(Continued)

(52) U.S. Cl.
CPC ............ *B60R 16/033* (2013.01); *B60R 16/03* (2013.01); *H02J 1/10* (2013.01); *H02J 7/1423* (2013.01);
(Continued)

(58) Field of Classification Search
CPC .......... B60R 16/033; B60R 16/03; H02J 1/10; H02J 7/1423; Y02T 10/7005; Y02T 10/7022; Y10S 903/903
See application file for complete search history.

(56) References Cited

U.S. PATENT DOCUMENTS

| | | |
|---|---|---|
| 2005/0151509 A1 | 7/2005 | Cook |
| 2005/0212495 A1 | 9/2005 | Leyten et al. |
| 2011/0140518 A1* | 6/2011 | Hattori ................ H02J 7/1423 |
| | | 307/9.1 |

FOREIGN PATENT DOCUMENTS

| | | |
|---|---|---|
| DE | 40 28 242 A1 | 3/1992 |
| DE | 299 19 099 U1 | 5/2000 |

(Continued)

OTHER PUBLICATIONS

International Search Report (PCT/ISA/210) dated Oct. 7, 2013 with English translation (Six (6) pages).
(Continued)

*Primary Examiner* — Jared Fureman
*Assistant Examiner* — Rafael Pacheco
(74) *Attorney, Agent, or Firm* — Crowell & Moring LLP

(57) ABSTRACT

A vehicle has a first partial onboard power supply system and a second partial onboard power supply system which is electrically connected with the first partial onboard power supply system at at least a first nodal point. The first partial onboard power supply system includes a first group of electric consumers and the second partial onboard power supply system includes a second group of electric consumers. The first partial onboard power supply system includes a starter, an onboard power supply system accumulator connected parallel to the starter and a first switch between the first group of consumers and the onboard power supply system accumulator. The second partial onboard power supply system includes a first direct-voltage controller, an electric support accumulator connected parallel to the second group of electric consumers at a second modal point, and an interface of the first direct-voltage controller connected with the second nodal point. The electric support accumulator has an electric center tap, and the center tap is
(Continued)

connected with the first nodal point by way of a second switch.

10 Claims, 3 Drawing Sheets

(51) Int. Cl.
*H02J 7/14* (2006.01)
*B60R 16/03* (2006.01)

(52) U.S. Cl.
CPC ........ *Y02T 10/7005* (2013.01); *Y02T 10/7022* (2013.01); *Y10S 903/903* (2013.01)

(56) References Cited

FOREIGN PATENT DOCUMENTS

| DE | 199 51 128 A1 | 4/2001 |
|----|---------------|--------|
| DE | 102 48 658 A1 | 5/2004 |
| DE | 10 2007 014 383 A1 | 10/2008 |
| DE | 10 2007 017 187 A1 | 10/2008 |
| DE | 10 2010 027 863 A1 | 12/2011 |
| EP | 1 562 252 A1 | 8/2005 |
| EP | 1 848 090 A2 | 10/2007 |

OTHER PUBLICATIONS

German Search Report dated Jan. 14, 2013 with partial English translation (Ten (10) pages).

\* cited by examiner

BACKUP STORE WITH CENTER TAP FOR VEHICLE ONBOARD POWER SUPPLY SYSTEM

CROSS REFERENCE TO RELATED APPLICATIONS

This application is a continuation of PCT International Application No. PCT/EP2013/058471, filed Apr. 24, 2013, which claims priority under 35 U.S.C. §119 from German Patent Application No. 10 2012 206 772.8, filed Apr. 25, 2012, the entire disclosures of which are herein expressly incorporated by reference.

BACKGROUND AND SUMMARY OF THE INVENTION

The invention relates to a vehicle having a first partial onboard power supply system and having a second partial onboard power supply system which is electrically connected with the first partial onboard power supply system at at least a first nodal point, the first partial onboard power supply system comprising a first group of electric consumers (loads) and the second partial onboard power supply system comprising a second group of electric consumers (loads).

The electric onboard power supply system of a vehicle is a complex system with several active and passive components. German Patent Document DE 10 2007 017 187 A1, for example, describes art onboard power supply system having voltage-sensitive loads of a vehicle with an engine start-stop function. The voltage-sensitive load is supported by way of a direct-voltage controller and a blocking element.

German Patent Document DE 102 48 658 A1 describes the voltage-related support of high-performance consumers by the parallel connection of a supercap module. The supercap module supports voltage-sensitive consumers, particularly during a start of an internal-combustion engine.

It is an object of the invention provide an improved vehicle having a first partial onboard power supply system and a second partial onboard power supply system, which is electrically connected with the first partial onboard power supply system, at at least a first nodal point, The first partial onboard power supply system includes a first group of electric consumers, and the second partial onboard power supply system including a second group of electric consumers.

This and other objects are achieved by a vehicle, according to the invention, wherein the first partial onboard power supply system comprises a starter, an onboard power supply system connected parallel to the starter and a first switch between the first group of consumers and the electric onboard power supply accumulator, and the second partial onboard power supply system comprises a first direct-voltage controller, an electric support accumulator module, which is switched parallel to the second group of electric consumers at a second nodal point, an interface of the first direct-voltage controller being connected with the first nodal point and has an electric center tap, which is connected with the first nodal point by way of a second switch.

In this document, the term "center tap" means that the electric potential, which decreases over the entire support accumulator module, according to the principle of a voltage divider, can be partially tapped at the center tap, i.e. in the case of an electric potential lower than the potential decreasing on the whole. This means that the support accumulator module supports, i.e. supplies with electric energy and power, the second group of electric consumers, and that, when the second switch is closed, the support accumulator module, by way of the center tap, additionally supports the first group of electric consumers.

According to a particularly preferred embodiment of the invention, the support accumulator module electrically comprises a first partial accumulator and a second partial accumulator in series. The center tap is situated between the first partial accumulator and the second partial accumulator.

The two partial accumulators may be constructed as self-sufficient energy accumulators, which jointly form the support accumulator module, or may be components of an energy accumulator which forms the support accumulator module.

In a further embodiment of the invention, the vehicle has an internal-combustion-power-type unit that can be started by a starter, in which case the vehicle is constructed as: (i) an internal-combustion engine vehicle having a generator that is connected with the first nodal point or with the second nodal point, (ii) a plug-in hybrid vehicle or hybrid vehicle having a high-voltage onboard power supply system that, by way of a second direct-voltage controller, is connected with the first nodal point, or (iii) an electric vehicle having a range extender motor and having a high-voltage onboard power supply system that is connected by way of a second direct-voltage controller with the first nodal point.

In addition to the first partial onboard power supply system and the second partial onboard power supply system, the vehicle may also have a high-voltage onboard power supply system which is electrically connected with the two partial onboard power supply systems by way of a direct-voltage controller, if the vehicle also has an internal-combustion engine. The internal-combustion engine is not necessarily to be used as a traction engine but, as in the case of a battery-operated electric vehicle with a range-extending additional motor, can also be used as an auxiliary.

According to a further variant of the invention, the first partial onboard power supply system and the first partial accumulator have a nominal voltage of between 12 V and 14 V, and the second partial onboard power supply system has a nominal voltage of between 12 V and 60 V.

Accordingly, the second group of electric consumers has a higher nominal voltage than the first group of electric consumers. The nominal voltage of the support accumulator module corresponds to the nominal voltage of the second group of electric consumers, and the nominal voltage of the first partial accumulator corresponds to the nominal voltage of the first group of electric consumers.

It is advantageous for the support accumulator nodule to be constructed of supercapacitor cells, or for the support accumulator module to be constructed of lithium ion cells.

Supercapacitor cells as well as lithium ion cells have a high cyclization capacity and a high current load capacity, which seems to make then particularly suitable for use as support accumulator components.

According to a further embodiment of the invention, the vehicle can take up a driving operation during which the first switch is closed and the second switch is open, or the first switch is open and the second switch is closed; the vehicle can take up an additional-start operation, during which the first switch is open and the second switch is closed; and the vehicle can take up an equilibrating operation, during which the first switch is closed and the second switch is closed.

This means that, in a driving operation in which the first switch is closed and the second switch is open, the onboard power supply system supports the first group of electric consumers and the support accumulator module supports the second group of electric consumers. In this driving operation, the onboard power supply accumulator can be charged at the first nodal point if the electric potential is sufficiently high, and the support accumulator module can be charged at the second nodal point if the electric potential is sufficiently high.

If the first switch is open and the second switch is closed in the driving operation, the support accumulator module will support the second group of electric consumers and the first partial accumulator will support the first group of electric consumers.

In an additional-start operation, the starter is actuated, in which case the first switch is opened and the second switch is closed. During the start, a voltage drop occurs at the onboard power supply system accumulator, from which the first group of electric consumers is uncoupled. Instead, the first group of electric consumers is supported by the first partial accumulator. In this case, the latter is possibly significantly discharged or charged. After the start, the first switch is closed and the second switch also remains closed, which is called an equilibrating operation. In the equilibrating operation, the second partial accumulator is discharged by way of a potential drop at the second nodal point or by way of a potential rise at the second nodal point, until the first partial accumulator and the second partial accumulator have a comparable relative charging state. Subsequently, the second switch is opened, whereby the driving operation is established.

The invention is based on the considerations indicated in the following.

There are vehicles with an internal-combustion engine which have a conventional 12 V onboard energy (power) supply system for supplying electric energy. Plug-in hybrid vehicles and battery-electric vehicles have an electrified drive train with a conventional 12 V onboard energy supply system and a high-voltage power supply system, the high-voltage power supply system being assigned to the electric supply of the drive train and the 12 V onboard power supply system being assigned to the supply of the additional electric consumers in the vehicle.

The conventional 12 V onboard power supply system architecture is hardly capable of meeting the demands as a result of the integration of additional consumers into the onboard power supply system, particularly of high-performance consumers, such as electric steering systems, electric roll stabilization systems or additional-start systems of hybridized vehicles.

It is therefore suggested to carry out a skillful expansion of the onboard power supply system at a voltage of 48 V for high-performance consumers and to wire up this voltage level with the 12 V level, so that the demands of high-performance consumers and additional-start systems can be met simultaneously while the stability criteria of the onboard power supply branches are observed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
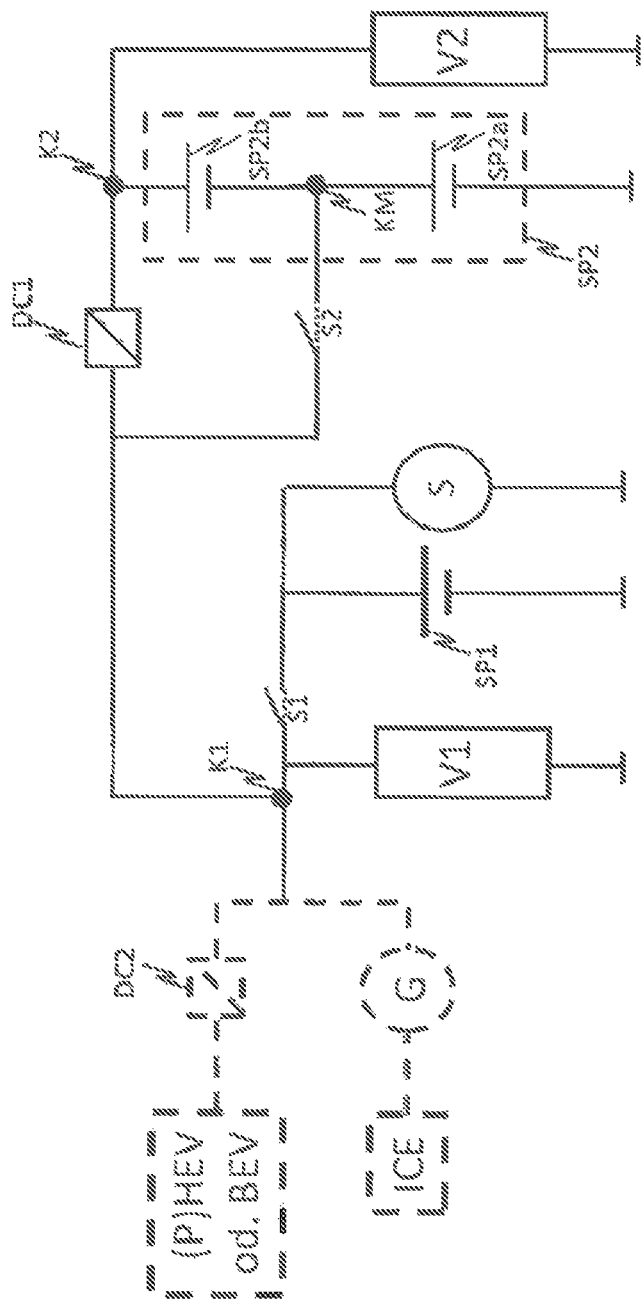
FIG. 1 is a schematic diagram of an embodiment of a vehicle having a support accumulator with a center tap.
Figure 2:
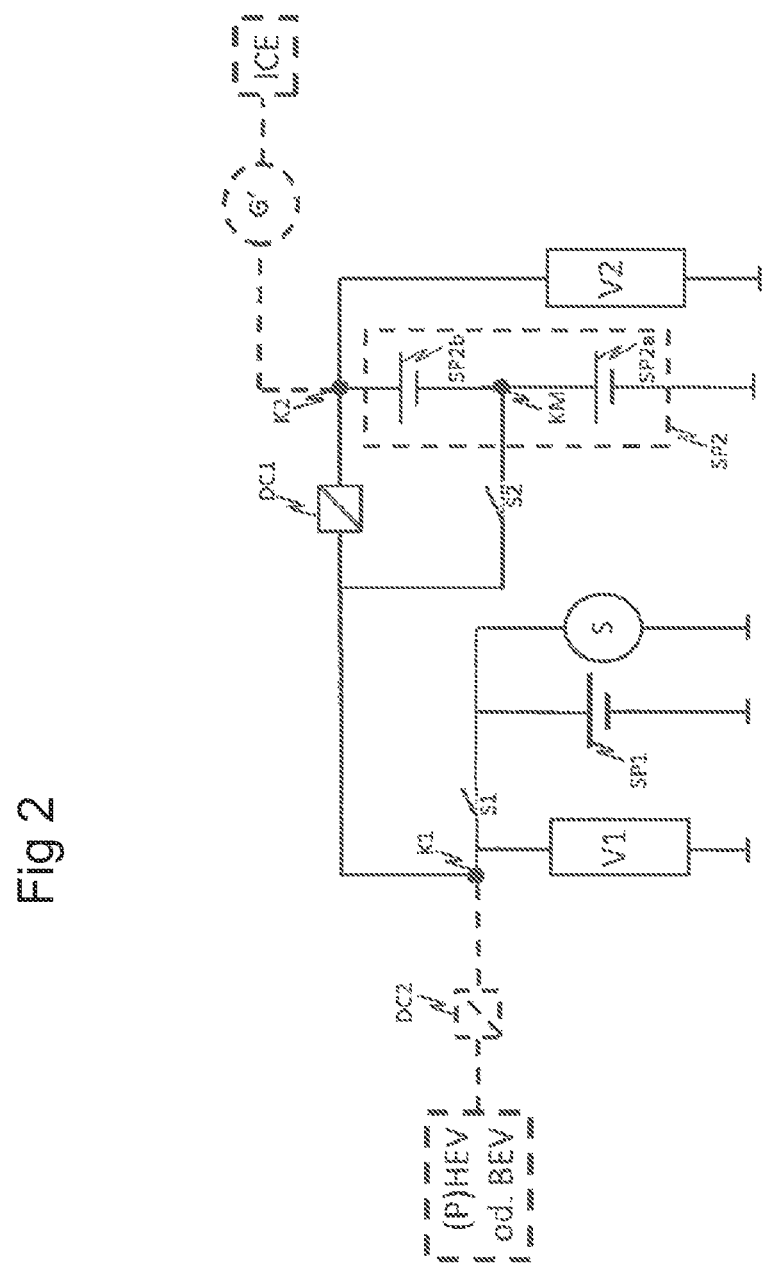
FIG. 2 is a schematic diagram of another embodiment of a vehicle having a support accumulator with a center tap.

FIG. 1 and FIG. 2 illustrate architectures of a vehicle having two low-voltage onboard power supply systems. The vehicle may be further developed either as a vehicle with only an internal-combine engine (ICEV) and a generator, the generator (G) being situated at the potential of the nodal point (K1) (see FIG. 1.) or the generator (G') being situated at the potential of the nodal point (K3) (see FIG. 2). According to an alternative embodiment in FIG. 1 and FIG. 2, the vehicle may be constructed as a vehicle with an electrified drive train, i.e. as a plug-in hybrid vehicle (PHEV), as a hybrid vehicle (HEV) or as a battery electric vehicle with a range extender motor (BEV), which each have a high-voltage direct-voltage controller (DC2), which is also called a second direct-voltage controller. The direct-voltage controller (DC2) has a low-voltage-side interface which is situated at the potential of the nodal point (K1).

According to FIG. 1 and FIG. 2, a first partial onboard power supply system is linked to the nodal point (K1), which first partial onboard power supply system comprises electric consumers (V1), a first switch (S1), an electric energy accumulator, as the onboard power supply accumulator (SP1), and a starter (S). In this embodiment, the first partial onboard power supply system has a nominal voltage of 12 V. Without any loss of generality, the onboard power supply accumulator may be constructed as a lead acid battery or as a lithium ion battery. The electric consumers (V1) comprise conventional electric loads of automatic engineering, such as windshield wipers, seat heaters, steering devices, etc.

According to FIG. 1 and FIG. 2, a second partial onboard power supply system with a first bidirectional direct-voltage controller (DC1), a second switch (S2), electric high-performance consumers (V2) and a support accumulator (SP2) is linked to the nodal point (K1). Starting from the nodal point (K1), an electric path with a second switch (S2) is connected parallel to the first direct-voltage controller (DC1), which path has a voltage-dividing tap (KM) at the support accumulator (SP2). An interface of the first direct-voltage controller is connected with the nodal point (K1), and a further interface is connected with the potential (K2) and of the high-performance consumers.

The center tap (KM) divides the accumulator (SP2) into a first partial accumulator (SP2a) and a second partial accumulator (SP2b). The high-performance consumers (V2) are linked parallel to the support accumulator (SP2). The second partial onboard power supply system has a nominal voltage of between 20 V and 60 V, in this embodiment of 48 V. Without any loss of generality, the support accumulator (SP2) is constructed as a supercapacitor module which, in the form of the first partial accumulator, has a supercapacitor partial module with a nominal voltage of 12 V and, in the form of the second partial accumulator, has a supercapacitor partial module with a nominal voltage of 36 V, The supercapacitor partial modules are each constructed of a series connection of several supercapacitor cells of the same single-cell nominal voltage. In the case of a nominal cell voltage of approximately 2 V, the first partial accumulator (SP2b) consists of six supercapacitor cells, and the second partial accumulator (SP2a) consists of 18 supercapacitor cells. As an alternative to the supercapacitor cells, lithium ion cells may be used. Independently of an operating state of the support accumulator, the supercapacitor cells forming the first partial module have essentially the same single-cell voltage, which is called the first partial-module voltage, and the supercapacitor cells forming the second partial module have essentially the same single-cell voltage, which is called the second partial-module voltage.

Those consumers which have a brief high power demand may be summarized as high-performance consumers (V2). These are, for example, electric Chassis components, such as an electric steering system or an electric roll stabilization system of the vehicle in the event of a driving maneuver, for example, obstacle avoidance at high speed. In FIG. 1, the optional generator (G) is designed as a 12 V generator; in FIG. 2, the optional generator (G') is designed as a 48 V generator with an operating range of, for example, 36-52 V.

The starter (S), which in FIGS. 1 and 2, also has a brief high power demand, is integrated in the first partial onboard power supply system and is not included as one of the high-performance consumers (V2).

During the regular driving operation, the first switch (S1) may be closed and the second switch (S2) may be open, This means that the consumers (V1) of the first partial onboard power supply system are electrically supplied and supported in a voltage related manner by the onboard power supply accumulator (SP1), and, in addition, are supplied with electric energy either by way of the second direct-voltage controller (DC2) from the high-voltage onboard power supply system or by the generator (G).

The high-performance consumers (V2) of the second partial onboard power supply system are electrically supplied and supported in a voltage-related manner by the support accumulator (SP2) and additionally supplied with electric energy either by way of the second direct-voltage controller (DC2) and the first direct-voltage controller (DC1) from the high-voltage onboard power supply system or—according to FIG. 1—by the generator (G) by way of the first direct-voltage controller (DC1) or—according to FIG. 2—by the generator (G').

Figure 3:
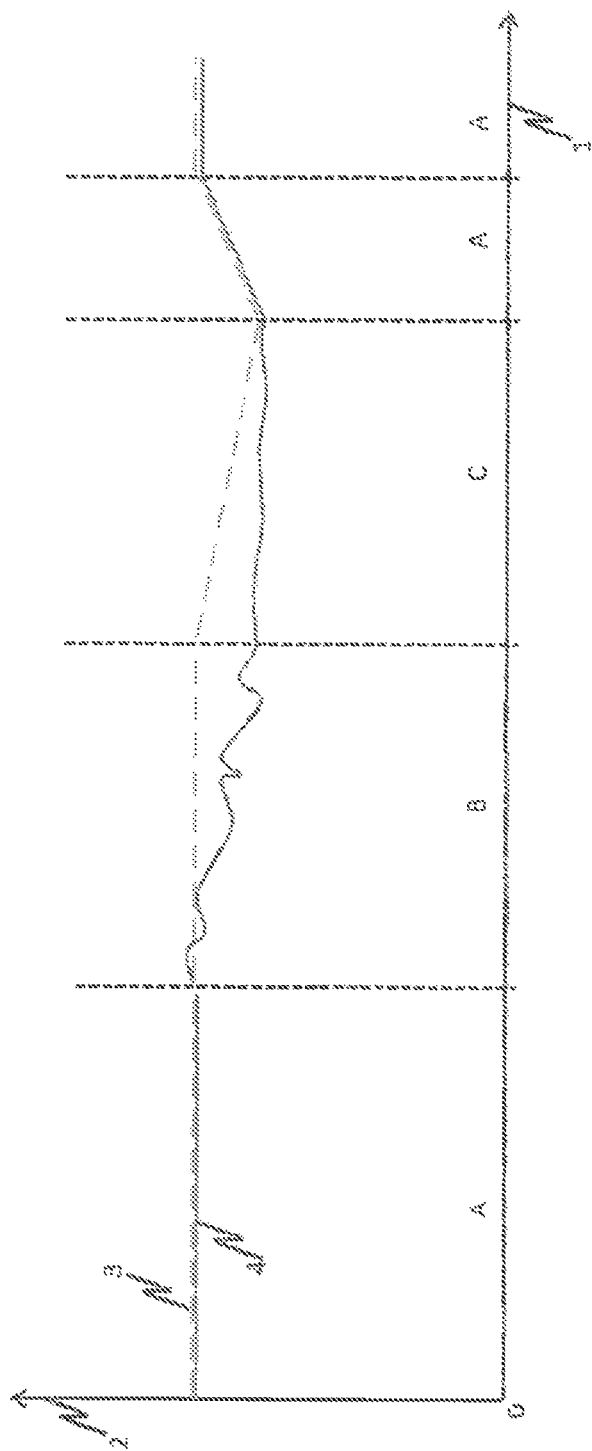
FIG. 3 is a graphical view of an operation-dependent voltage curve at the support accumulator with the center tap.

The regular driving operation is marked (A) in FIG. 3, The transverse axis (1) indicates the time; the vertical axis indicates the voltage. The curve (3) indicates the single-cell voltage of the cells forming the first partial accumulator, i.e. the first partial-module voltage; the curve (4) indicates the single-cell voltage of the cells forming the second partial accumulator, i.e. the second partial-module voltage. In the regular driving operation (A), these two single-cell voltages are essentially comparable because of the open switch (S2).

In the case of a power demand by the starter (5), according to FIG. 1 and FIG. 2, the first switch (S1) is opened and the second switch (S2) is closed. This means that, at the moment of the start, although the starter is supplied by the onboard power supply system (SP1), it is uncoupled from the first partial onboard power supply system. This operation is called an "additional-start operation". The consumers (V1) are electrically supplied and supported in a voltage-related manner from the first part module (SP2a), This means that a discharge of the first partial module (SP2a) may occur that is independent of the second partial module (SP2b). The supercapacitor cells forming the first partial module in comparison to the supercapacitor cells forming the second partial module therefore have a lower charging state and a lower single-cell voltage. This state is called unequilibrated. A state in which the supercapacitor cells forming the first partial module in comparison to the supercapacitor cells forming the second partial module have a higher charging state and a higher single-cell voltage is also unequilibrated.

Semiconductor switches may be used as switches (S1) and (S2). When an additional-start operation is set from the regular driving operation, it is advantageous to first close the second switch (S2) and then ideally within a time window in the order of milliseconds—open the first switch (S1), so that the electric consumers (y are continuously supported with respect to the voltage.

In FIG. 3, the additional-start operation is marked (B). As time advances, a drift will occur between the single-cell voltage of the cells forming the first partial accumulator and the single-cell voltage of the cells forming the second partial accumulator.

After an actuating of the starter (S), the first switch (S1) is closed in FIG. 1 and FIG. 2. The second switch (S2) also remains closed at first. The state when the first switch (S1) is closed and the second switch (S2) is closed is called equilibration, and is illustrated in FIG. 3 as operating mode (C).

In the case of the equilibration, a charge adaptation between the unequilibrated partial accumulators (SP2a) and (SP2b) is endeavored. In the equilibrated state, all supercapacitor cells forming the two partial accumulators have a comparable single-cell voltage.

In FIG. 1 and FIG. 2, the equilibration can take place by a targeted discharging of the second partial accumulator when the supercapacitor cells forming the first partial accumulator in comparison to the supercapacitor cells forming the second partial accumulator have a lower charging state and a lower single-cell voltage. The discharging of the second partial accumulator (SP2b) can take place by way of the second direct-voltage controller into the first partial onboard power supply system. This discharging will be maintained until the single-cell voltage of the cells forming the second partial accumulator has reached the single-cell voltage of the cells forming the first partial accumulator.

As an alternative, the equilibration can take place by a targeted charging of the second partial accumulator when the supercapacitor cells forming the first partial accumulator in comparison o the supercapacitor cells forming the second partial accumulator have a higher charging state and a higher single-cell voltage. Then, the second partial accumulator can be charged by way of the first direct-current controller when the second switch is closed by placing a charging potential between the center tap (KM) and the second nodal point (K2) by the first direct-current controller. The charging will be maintained until the single-cell voltage of the cells forming the second partial accumulator has reached the single-cell voltage of the cells forming the first partial accumulator. According to FIG. 2, as an alternative, the charging for the equilibration can take place by way of the generator (G').

According to FIG. 3, the equilibration (C), by which the second partial accumulator is discharged in this embodiment, leads to an adaptation of the second partial-module voltage to the first partial-module voltage.

The second switch (S2) is opened in the equilibrated state in FIG. 1 and FIG. 2. In the equilibrated state, the first switch (S1) is therefore closed and the second switch (S2) is open. This corresponds to the setting in the regular driving operation and is marked (A) in FIG. 3. In the equilibrated state, the support accumulator can be charged by way of the bidirectional direct-voltage controller (DC1) in that a charging potential is placed at the nodal point (K2). In this case, the charging power originates from the first partial onboard power supply system or additionally by way of the second direct-voltage controller (DC2) from the high-voltage onboard power supply system or—in the case of FIG. 1—by way of the generator (G). in the case of FIG. 2, the charging power may also originate from the generator (G'), The two partial accumulators can be efficiently charged only in the equilibrated state because, in a series connection of supercapacitor cells, an increased drop of the charging potential would otherwise occur at the more charged supercapacitor cells at the expense of the less charged supercapacitor cells, In this manner, the unequilibrated state would also be further intensified.

In addition to this embodiment, according to an alternative embodiment, in the regular driving operation according to FIG. 1 and FIG. 2, the first switch is open (S1) and the second switch (S2) is closed. This will, for example, be advantageous in cases in which a hybrid vehicle in the regular driving operation is in a state in which the drive is electrically supplied while the internal-combustion engine is not operating. The support accumulator will then supply the high-performance consumers (V2), and the first partial accumulator will supply the electric consumers (V1). In this situation, the switching configuration of the additional-start operation, i.e. first switch (S1) open and second switch (S2) closed, is already preset in the regular driving operation. This offers the advantage of lower demands on the switching precision of the two switches (S1) and (S2). Relays can, for example, be used.

The architecture from FIG. 1 and FIG. 2 has the advantage that, independently of the vehicle type ICEV, PHEV, HEV or BEV, in the second partial onboard power supply system, high-performance consumers (V2) can be supplied, while maintaining a stable voltage in the first partial onboard power supply system and while the supply quality is high in the two partial onboard power supply systems. This supply quality also be maintained in the case of an additional start of the internal-combustion engine, which is ensured by the wiring-up of the two partial onboard power supply systems in combination with the switch positions as a function of operating modes of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
a first partial onboard power supply system and a second partial onboard power supply system, the second partial onboard power supply system being electrically connected with the first partial onboard power supply system at at least a first nodal point;
the first partial onboard power supply system comprising a first group of electric consumers;
the second partial onboard power supply system comprising a second group of electric consumers, wherein:
(a) the first partial onboard power supply system comprises a starter, an onboard power supply system accumulator connected parallel to the starter, and a first switch between the first group of consumers and the onboard power supply system accumulator,
(b) the second partial onboard power supply system comprises a first direct-voltage controller, an electric support accumulator connected parallel to the second group of electric consumers at a second nodal point, and an interface of the first direct-voltage controller connected with the second nodal point, wherein
the electric support accumulator has an electric center tap, and
the center tap is connected with the first nodal point by way of a second switch.

2. The vehicle according to claim 1, wherein:
the electric support accumulator comprises a first partial accumulator and a second partial accumulator electrically in series, and
the center tap is situated between the first partial accumulator and the second partial accumulator.

3. The vehicle according to claim 2, wherein:
the vehicle has an internal-combustion engine unit startable by the starter, the vehicle is constructed as one of : (a) an internal-combustion engine vehicle having a generator, which is connected with the first nodal point or with the second nodal point, (b) a plug-in hybrid vehicle or hybrid vehicle with a high-voltage onboard power supply system, which is connected by way of a second direct-voltage controller with the first nodal point, or (c) an electric vehicle having a range extender motor and having a high-voltage onboard power supply system, which is connected by way of a second direct-voltage controller with the first nodal point.

4. The vehicle according to claim 1, wherein:
the vehicle has an internal-combustion engine unit startable by the starter, the vehicle is constructed as one of: (a) an internal-combustion engine vehicle having a generator, which is connected with the first nodal point or with the second nodal point, (b) a plug-in hybrid vehicle or hybrid vehicle with a high-voltage onboard power supply system, which is connected by way of a second direct-voltage controller with the first nodal point, or (c) an electric vehicle having a range extender motor and having a high-voltage onboard power supply system, which is connected by way of a second direct-voltage controller with the first nodal point.

5. The vehicle according to claim 1, wherein:
the first partial onboard power supply system and the first partial accumulator each have a nominal voltage of between 9 V and 16 V, and the second partial onboard power supply system has a nominal voltage of between 12 V and 60 V.

6. The vehicle according to claim 3, wherein:
the first partial. onboard power supply system and the first partial accumulator each have a nominal voltage of between 9 V and 16 V, and
the second partial onboard power supply system has a nominal voltage of between 12 V and 60 V.

7. The vehicle according to claim 1, wherein:
the electric support accumulator is constructed of supercapacitor cells or lithium ion cells.

8. The vehicle according to claim 6, wherein:
the electric support accumulator is constructed of supercapacitor cells or lithium ion cells.

9. The vehicle according to claim 1, wherein:
the vehicle can take up a driving operation, in which the first switch is closed and the second switch is open, or which the first switch is open and the second switch is closed,
the vehicle can take up an additional-start operation, in which the first switch is open and the second switch is closed, and
the vehicle can take up an equilibrating operation, in which t e first switch is closed and the second switch is closed.

10. The vehicle according to claim 8, wherein:
the vehicle can take up a driving operation, in which the first switch is closed and the second switch is open, or in which the first switch is open and the second switch is closed, the vehicle can take up an additional-start operation, which the first switch is open and the second switch is closed, and the vehicle can take up an equilibrating operation, in which t e first switch is closed and the second switch is closed.

* * * * *